Figure 1:
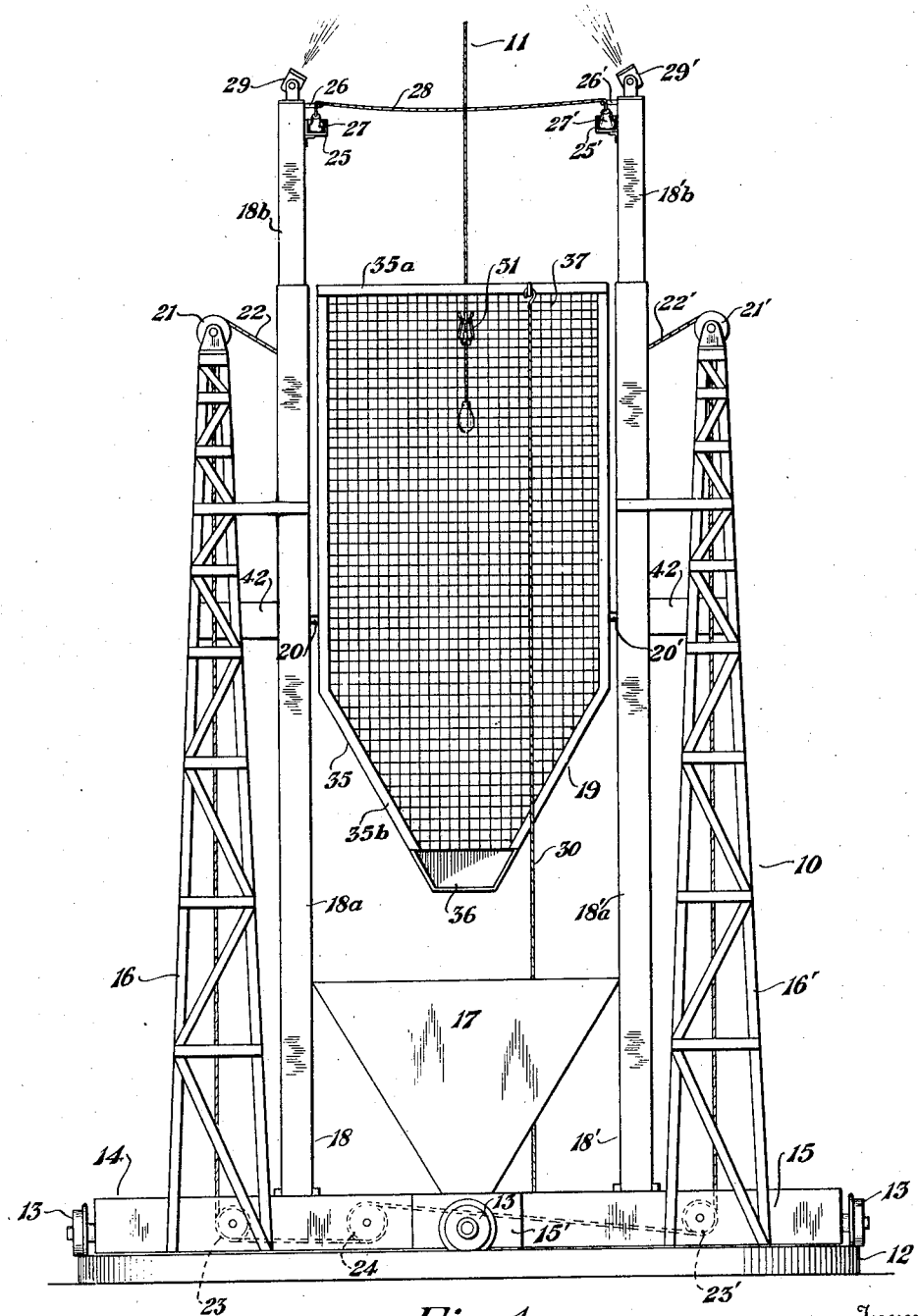

Inventor
Manuel Castro
By Harry Frease
Attorney

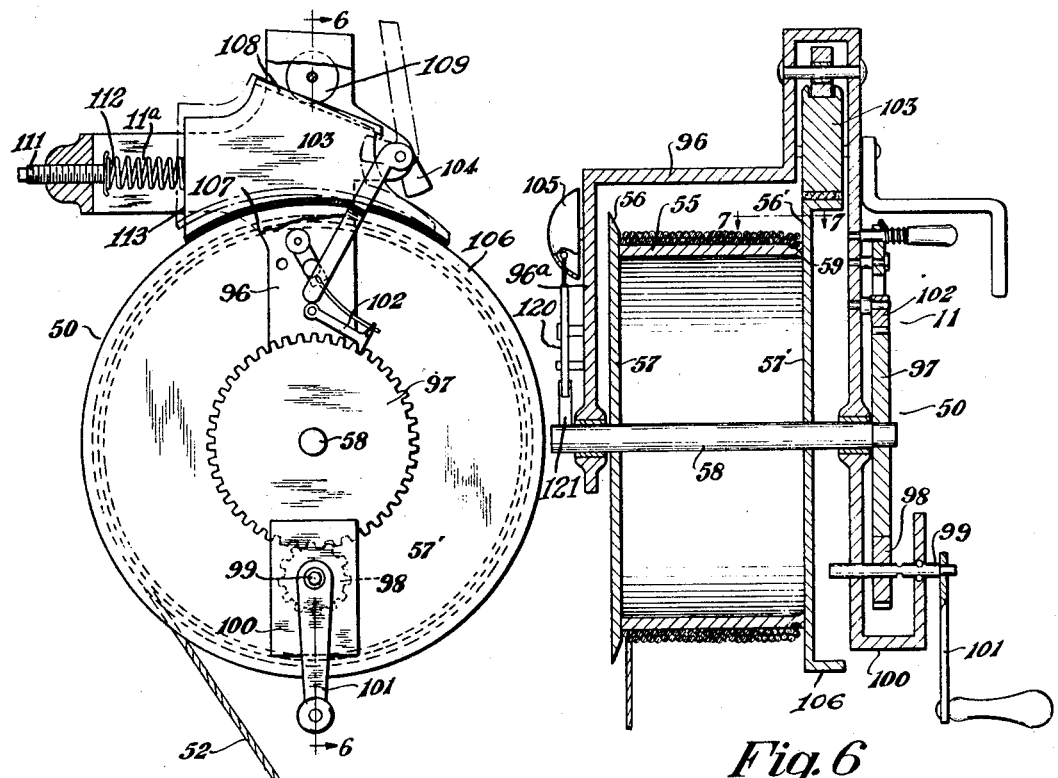
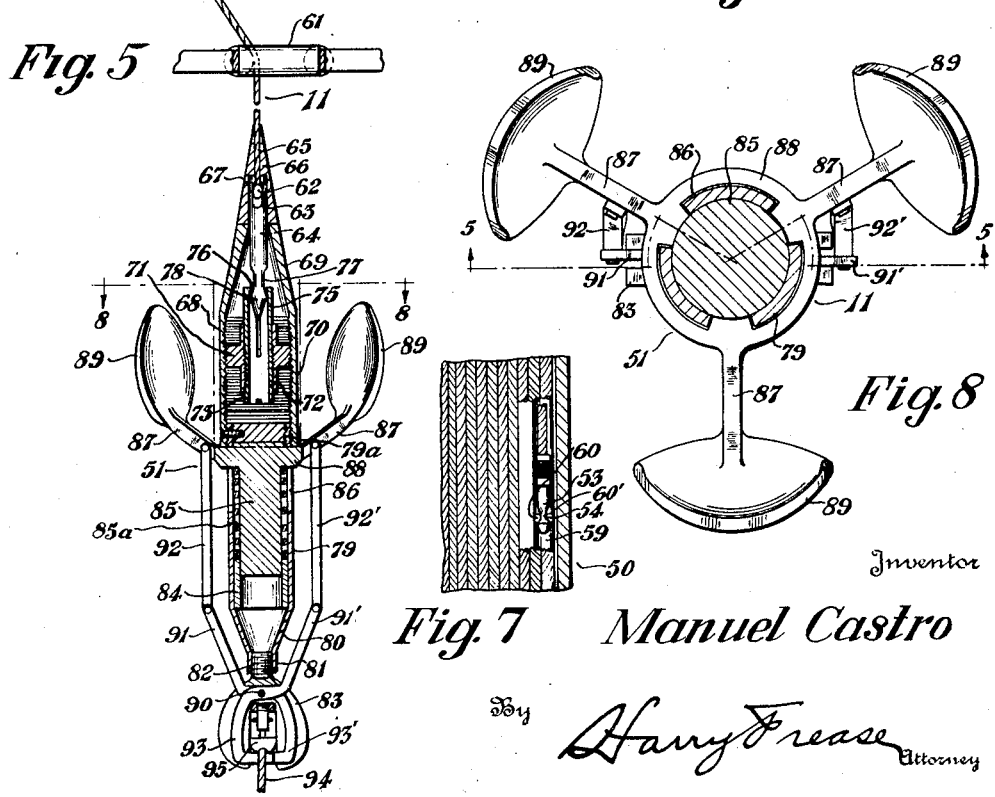

Nov. 14, 1933.  M. CASTRO  1,935,077
CARGO HANDLING APPARATUS FOR AIRCRAFT AND THE LIKE
Filed Oct. 2, 1928  5 Sheets-Sheet 5
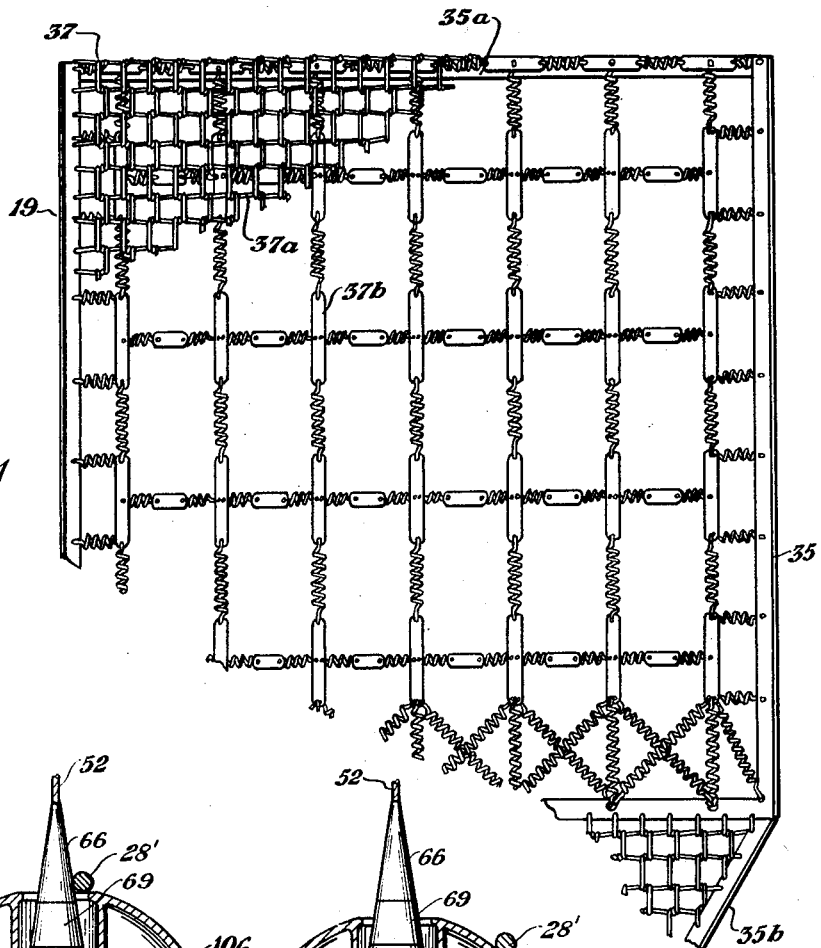
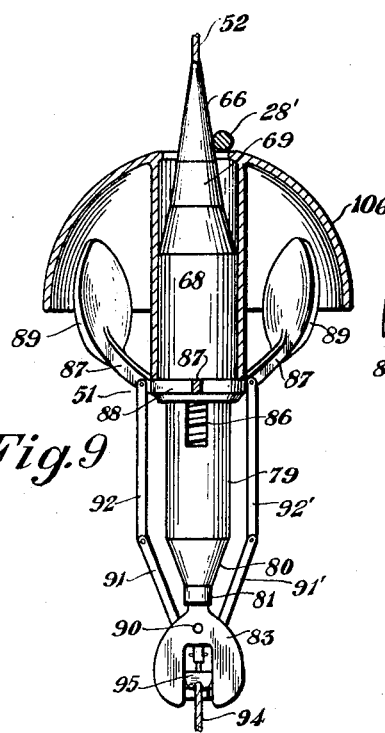
Inventor
Manuel Castro
By Harry Frease
Attorney Patented Nov. 14, 1933

1,935,077

UNITED STATES PATENT OFFICE 1,935,077

CARGO HANDLING APPARATUS FOR AIRCRAFT AND THE LIKE

Manuel Castro, Canton, Ohio

Application October 2, 1928. Serial No. 309,881

14 Claims. (Cl. 258—1)

My invention relates to apparatus for picking up and discharging cargo from aircraft in flight.

Such apparatus necessarily includes elements operatively mounted on the ground or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for cooperating with the ground elements in picking up and discharging cargo.

A fundamental requirement for the successful operation of such apparatus, is to impart to the cargo to be picked up from rest, the required acceleration so that it will attain the velocity or flying speed of the aircraft without reducing the flying speed of the aircraft to any considerable extent.

For example it is estimated that for an aircraft of 2,000 pounds gross load (total weight lifted), and with sufficient excess power to climb 300 ft./min., there is available sufficient excess thrust to provide a force of approximately 97.5 lbs. at 70 M. P. H. flying speed, for use in imparting to the cargo being picked up from rest the necessary acceleration so that it will attain the desired velocity.

Under these circumstances the distance required to be covered by the cargo from the instant it is connected with the pick up means until it attains the speed of the aircraft is as follows:

For 50 lbs. cargo, distance _____ 84.3 ft.
For 40 lbs. cargo, distance _____ 67.5 ft.
For 30 lbs. cargo, distance _____ 50.6 ft.
For 20 lbs. cargo, distance _____ 33.7 ft.
For 10 lbs. cargo, distance _____ 16.9 ft.

In other words, it is necessary for the successful operation of such apparatus that the pick up means be secured to a cable which is permitted an extension of 84.3, 67.5, 50.6, 33.7, or 16.9 feet according to the load to be picked up, as aforesaid.

Accordingly the objects of the present invention include the provision of an improved cargo handling apparatus for aircraft and the like, in which the aircraft elements include pick up means, a cable upon which the pick up means are secured, and yielding means for permitting the necessary extension of the cable for imparting the aforesaid acceleration to the cargo being picked up from rest.

Further objects of the present invention include the provision of an improved and cooperating arrangement of the ground elements and the aircraft elements of the apparatus.

Further objects of the improvements include the provision of a safety connection between the cable and the aircraft, whereby if the pick up means become caught in an immovable object, the cable will be released from the aircraft when the force on the cable thus exerted becomes greater than a predetermined amount.

Figure 2:
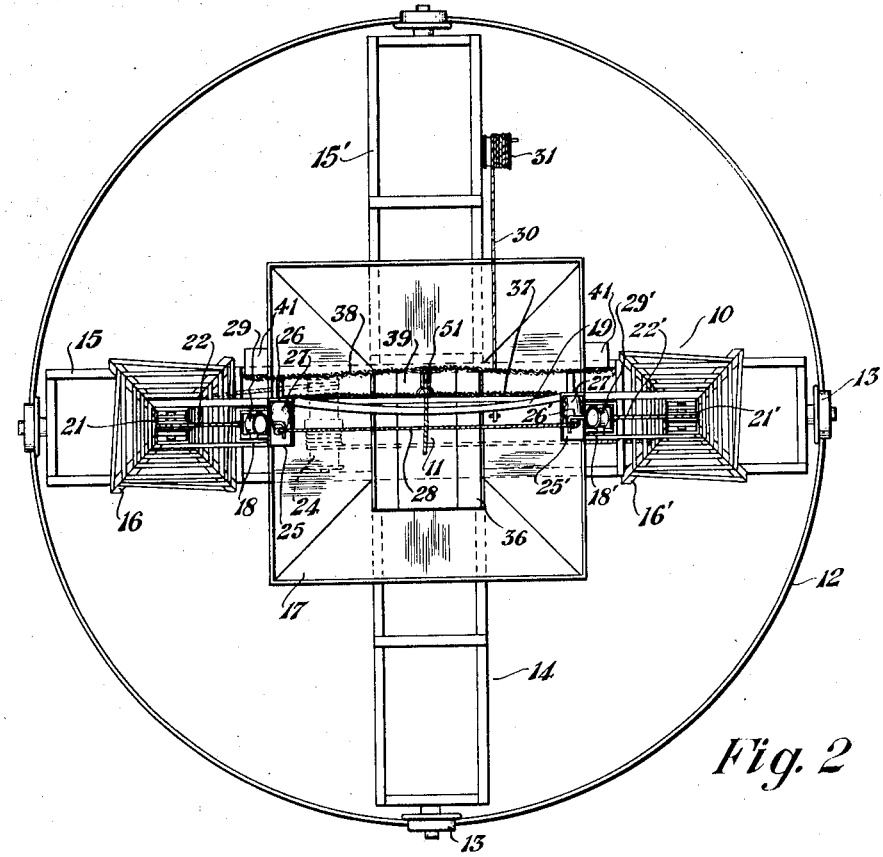
Figure 4:
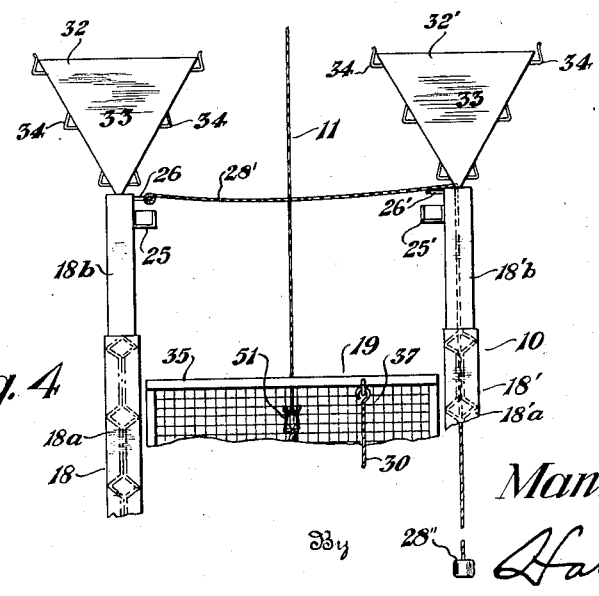
Figure 3:
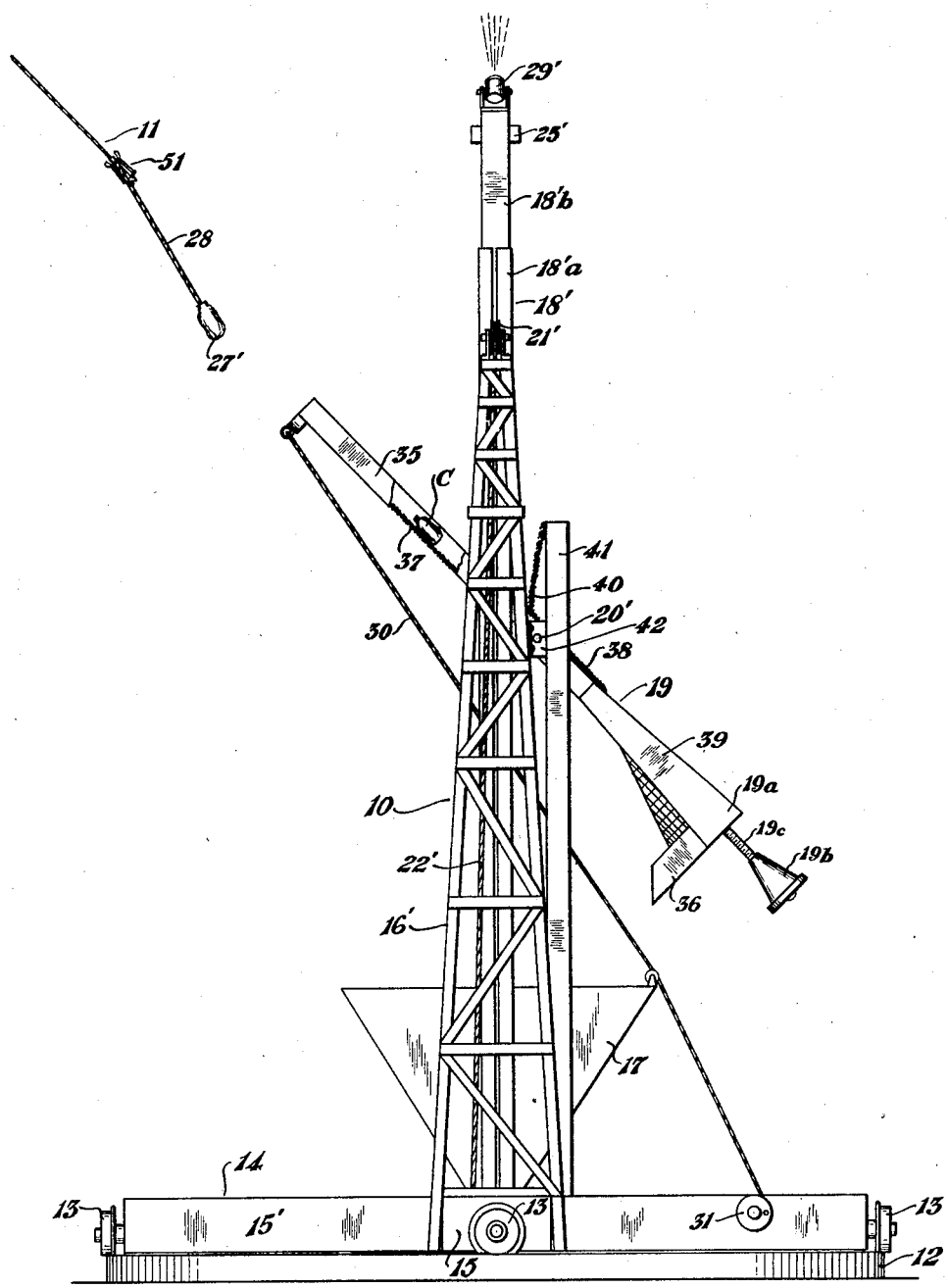

These and ancillary objects are attained in the improved cargo handling apparatus for aircraft and the like comprising the present invention, a preferred embodiment of which is hereinafter set forth in detail, and is illustrated in the accompanying drawings forming part hereof, in which Figure 1 is a fragmentary front elevation illustrating the improved cargo handling apparatus ready for automatic operation at night for discharging a cargo and picking up another cargo;

Fig. 2, a plan view thereof;

Fig. 3, a fragmentary side elevation thereof illustrating the apparatus just after the cargo has been discharged and received by the ground elements and the new cargo has been picked up by the aircraft elements;

Fig. 4, a fragmentary view similar to Fig. 1, illustrating the apparatus ready for operation in the day time.

Fig. 5, a fragmentary elevation view illustrating the aircraft elements of the apparatus, including the improved reel, the cable, and the improved combined automatically actuated cargo pick up and discharging means, the last mentioned means being illustrated in section as on line 5—5, Fig. 8;

Fig. 6, a sectional view of the improved reel as on line 6—6, Fig. 5;

Fig. 7, a fragmentary view thereof illustrating the cable releasing means, as on line 7—7, Fig. 6;

Fig. 8, a transverse sectional view of the combined cargo pick up and discharging means as on line 8—8, Fig. 5;

Fig. 9, an elevation view with portions in section illustrating the combined cargo pick up and discharging means arranged with an auxiliary shield actuator for permitting operation thereof only as a discharging means, the parts being arranged just at the instant of operation;

Fig. 10, a view similar to Fig. 9, illustrating the parts thereof after the discharging means have been operated for releasing the cargo; and Fig. 11, a fragmentary view illustrating the preferred construction of the tipping receptacle, which is one of the cooperating ground elements, and into which the cargo is discharged from the aircraft;

Similar numerals refer to similar parts throughout the drawings.

The improved cargo handling apparatus includes the ground elements indicated generally at 10 in Figs. 1 to 4 inclusive, and in part in Fig. 11, and the aircraft elements indicated generally at 11 in all of the figures of the drawings with the exception of Fig. 11.

The ground elements 10 include a circular track 12 mounted on a suitable foundation on the ground, or on a ground structure, or on a ship, and on which track are arranged to roll wheels 13 which are rotatably mounted on and support a base frame 14, whereby the base frame 14 and the remaining ground elements may be rotated about a vertical axis for placing the ground elements in the proper position with respect to the wind and the aircraft from which cargo is to be handled.

The base frame 14 may be in the form of a cross as illustrated, and may include axially and centrally intersecting panels 15 and 15' at the outer ends of each of which the wheels 13 are rotatably mounted.

Preferably at equal distances from and on opposite sides of the vertical axis, the base panel 15 has mounted thereon upwardly extending towers 16 and 16'.

A cargo receiving hopper 17 is preferably arranged between the towers 16 and 16'.

Between the hopper 17 and the tower 16 an upwardly extending telescopic mast 18 is mounted on the base panel 15, and similarly an upwardly extending telescopic mast 18' is mounted on the base panel 15 between the hopper 17 and the tower 16', and the vertical axes of the towers and the masts are preferably parallel and in the same plane, and the towers and masts are laterally spaced from each other.

A tipping receptacle 19 into which cargo is discharged, is mounted adjacent its lower end for rotation between the telescopic masts 18 and 18' about horizontal pivots 20 and 20' which are supported on the masts 18 and 18', respectively.

The telescopic mast 18 includes a lower tubular member 18a within which an upper extensible member 18b is slidably mounted. Similarly the telescopic mast 18' includes a lower tubular member 18'a within which an upper extensible member 18'b is slidably mounted.

A pulley 21 is journalled at the top of the tower 16 and a pulley 21' is journalled at the top of the tower 16'.

One end of a rope or cable 22 is secured to the extensible member 18b within the tubular member 18a, and the cable 22 passes out from the top of the tubular member 18a, over the pulley 21, and longitudinally through the tower 16, and about a direction changing pulley 23 at the base thereof, to a hoisting drum 24 journalled in the base panel 15, where the other end of the rope or cable 22 is secured to the drum.

Similarly, one end of a rope or cable 22' is secured to the extensible member 18'b within the tubular member 18'a, and the cable 22' passes out from the top of the tubular member 18'a, over the pulley 21', and longitudinally through the tower 16', and about a direction changing pulley 23' at the base thereof, to a hoisting drum 24, where the other end of the rope or cable 22' is secured to the drum; and the drum is adapted in a well known manner for reversely winding and unwinding the ropes or cables 22 and 22' thereabout, for simultaneously raising and lowering the extensible members 18b and 18'b.

At the inside face of the upper end of the extensible mast member 18b, a cargo positioning platform 25 is mounted, and similarly at the inside face of the upper end of the extensible mast member 18'b, a cargo positioning platform 25' is mounted.

Above the platform 25, a cargo connecting cable guide hook 26 is mounted on the mast member 18b, and similarly above the platform 25' a cargo connecting cable guide hook 26' is mounted on the mast member 18'b.

A bag 27 containing part of the cargo to be picked up is supported on the platform 25, and a bag 27' containing the remaining part of the cargo to be picked up is supported on the platform 25', the weight of the two bags and contents being adjusted to be substantially equal, and a cargo connecting cable 28 is fastened at its ends to the bags 27 and 27', respectively.

The cargo connecting cable 28 extends horizontally from guide hook to guide hook, and downwardly therefrom to the bags 27 and 27', the guide hooks opening in a direction perpendicular to the plane of the masts from one side of such plane.

For night operation, a beam search light 29 is mounted at the top of the extensible mast member 18b, and arranged to be rotated about a horizontal axis parallel to the plane of the masts, and similarly a beam search light 29' is mounted at the top of the extensible mast member 18'b, and arranged to be rotated about a horizontal axis perpendicular to the plane of the mast; whereby for night operation of the improved cargo handling apparatus the search lights 29 and 29' are adjusted so that their beams intersect on the vertical axis of the ground elements midway between the masts, at a predetermined distance above the horizontally extending connecting cable 28, so that the pilot of the oncoming aircraft may steer his craft to the intersection of the beams of the search lights.

A cable 30 is connected at its upper end with the tipping receptacle 19 and at its lower end with a suitable preferably automatic retrieving drum 31 for manually tipping the receptacle 19.

For day time operation, improved flag signals 32 and 32' are substituted for the search lights 29 and 29', and each of these flag signals is preferably in the form of a fabric triangle 33 carried between the bifurcated members of a spring yoke 34 which may be withdrawn into the tubular members of the telescoping mast as indicated in the dot and dash lines in Fig. 4.

The tipping receptacle 19 preferably includes members forming a closed frame 35 which is rectangular at its upper end as at 35a, and is tapered at its lower end as at 35b and terminates in a chute or pocket 36.

A preferably wire spring fabric 37 is stretched entirely across the frame opening and secured to the frame members at the off-side thereof; and a preferably wire spring fabric 38 is stretched across the lower end of the frame opening and secured to the frame members at the on-side thereof, forming a pocket at 39 at the lower end of the receptacle 19 into which cargo may drop and be delivered therein to the chute 36, and thence to the hopper 17.

The upper end of the on-side fabric 38 preferably extends free of the frame at 40 and therefrom upwardly to a position where it is secured at the ends of posts 41 provided at the on-side of the masts for this purpose and also for the purpose of forming a support for off-set bearing blocks 42 in which the receptacle pivots 20 and 20' are preferably journalled.

As illustrated in Fig. 3, the tipping receptacle 19 is provided at its lower end 19a with a counterbalance 19b slidably mounted on a screw 19c extending downwardly from the tipping receptacle.

Accordingly if a cargo bag C strikes the upper end of the receptacle 19, and is discharged thereon, the cargo bag C will either drop into the pocket 39 and out through the chute 36 into the hopper 17 or will rotate the upper end of the tipping receptacle 19 downwardly to a position from which the cargo bag C will drop directly into the hopper 17, depending upon the velocity with which the cargo bag C strikes the tipping receptacle.

In Fig. 11, a preferred type of off-side fabric 37 is illustrated, and includes woven wire fabric 37a of relatively small mesh to be impinged by the cargo to be discharged and the combined pick up and discharging means, backed by a spring fabric 37b of relatively large mesh.

The foregoing constitute the preferred embodiment of the ground members of the improved cargo handling apparatus for aircraft and the like.

The aircraft members of the improved cargo handling apparatus include an improved reel 50 suitably mounted in the aircraft fuselage not shown, and an improved combined pick up and discharging means 51, releasably connected to each other by a cable 52.

The reel end of the cable has secured thereon a releasing head 53 which has formed therein a neck groove 54.

The improved reel 50 includes a cylindric barrel 55 preferably provided at its ends with outwardly extending flanges 56 and 56', and the flanges may be the outer peripheral portions of end disks 57 and 57' for the reel barrel, which are secured to the reel shaft 58 extending therethrough, and coaxial with the barrel.

At one side of the outer surface of the reel barrel, an annular groove 59 is provided, and in which groove the releasing head 53 is arranged to lie, so that lugs 60 and 60' extending from the sides of the groove 59 may fit in the neck groove 54 of the head 53, for securing the cable to the reel barrel during normal operation of the reel.

If the cable 52 becomes entirely unwound from the reel barrel by reason of the fact that the pick up means has become hooked upon an immovable object, the head 53 will become disengaged from the lugs 60 and 60', so that the aircraft will not lose flying speed and fall or be otherwise damaged by the jerk on the cable 52.

The cable 52 is sufficiently long for being extended or payed out from the reel against a suitable unwinding reaction, in order that the aforesaid acceleration may be imparted to the cargo being picked up.

The outer end of the cable 52 passes through suitable guide rollers 61 in the bottom of the aircraft fuselage, and is manually removably connected with the combined pick up and discharging means 51, preferably by means of an enlarged head 62 formed on the end of the cable 52, and which head fits in a side opening socket 63 in a shank 64 extending from and normally secured to the pick up and discharging means. The cable is first passed with a sliding fit through an aperture 65 in a ferrule 66 and the aperture 65 communicates at its outer end with an enlarged outwardly opening socket 67 which tightly but slidably fits over the outer end of the shank 64, thereby releasably retaining the enlarged cable end head 62 in the socket 63.

The shank 64 extends as aforesaid outwardly and coaxially with the longitudinal axis of the pick up and discharging means 51, which means includes a tubular connecting head 68 which is tapered at its outer end as at 69 so that the outer surfaces of the ferrule and the connecting head will merge with each other for permitting the connecting cable of the cargo to be picked up, to slide easily thereover.

The cylindric body of the outer end portion 70 of the connecting head 68 is internally threaded and an externally threaded releasing jaw mounting plug 71 is screwed therein at a suitable longitudinal position.

The jaw mounting plug is provided with a threaded central aperture 72 therein, and in which is screwed the threaded outer end 73 of a set of tubular spring jaws 75; whereby, depending on the relative axial position of the tubular spring jaws and the plug 71, the end opening 76 of the jaws may be varied, and the gripping power of the jaws may be varied by screwing the threaded end of the jaws in the threaded aperture of the plug one way or the other.

The end of the shank 64 within the tubular connecting head 68 has formed therein a groove 77, thus providing an outer releasing head 78 which may be gripped by a varied force as aforesaid by the spring jaws 75.

Accordingly, these jaws may be adjusted so that if a force greater than 250 pounds for example is applied upon the pick up and discharging means opposite to the pull of the cable 52, the shank 64 will automatically disconnect from the pick up and discharging means, even though the cable has not been entirely unwound.

The automatic releasing of the reel end of the cable as aforesaid, and the automatic releasing of the pick up and discharging means are essential for insuring that the aircraft will not lose flying speed regardless of what force the pick up and discharging means may be subjected to.

The threaded end 79a of a hook and jaw mounting sleeve 79 is screwed into the connecting head 68, and the other end of the sleeve 79 is tapered at 80 and terminates in a reduced portion 81 in which a threaded connector 82 of a discharging tong mounting bracket 83 is screwed.

A relatively short spring seat and piston guide sleeve 84 is secured within the sleeve 79 adjacent the tapered end 80 thereof and the interior surface of the guide sleeve 84 forms a guide for a hook carrying piston 85 slidable therein.

As viewed in Figs. 5 and 8, the upper end of the sleeve 79 is provided with a plurality of longitudinally extending notches 86 for permitting hook arm 87 to extend therethrough from the piston 85, the several hook arms being strengthened by sectoral webs 88 connecting the same outside of the sleeve 79.

The piston 85 is inserted within a compression spring 85a, one end of which reacts against the inner end of the guide sleeve 84, and the other end of which reacts against the hook arms 87 to normally urge the piston and hook arms towards the connecting head 68.

Each hook arm 87 extends outwardly and upwardly as viewed in Fig. 5 and terminates preferably in a spoon end 89.

The mounting bracket 83 is preferably in the form of an outwardly opening U, and a pivot pin 90, at the base of the U adjacent the connector 82, forms a pivotal mounting for discharging tong arms 91 and 91', respectively, the upper ends of which above the pivotal mounting are pivotally connected with adjacent ends of links 92 and 92', respectively, and the upper ends of the links are pivotally connected each with one of the hook arms 87.

The lower ends of the tong arms 91 and 91' below the pivotal mounting 90 are provided with laterally extending terminal hooks 93 and 93', which in the position illustrated in Figs. 5 and 9, form a ring-like closure for the eye 94 of a cable secured to the cargo bag to be discharged.

Accordingly, when any of the hook arms 87 are moved downwardly, as viewed in Fig. 5, the tongs will be actuated to separate the terminal hooks 93 and 93', thereby releasing the same from the eye 94.

For insuring the discharge of the eye 94 from the terminal hooks, a spring pressed plunger 95 is mounted within the U opening of the mounting bracket 83.

The reel shaft 58 is journalled in a suitable reel mounting bracket 96, and the ends of the shaft extend outwardly therefrom, and a gear wheel 97 is secured at one end of the shaft 58 and arranged to be selectively engaged by a drive pinion 98 secured on a sliding stub shaft 99, which is slidably and rotatably mounted in a suitable U extension 100 of the reel mounting bracket 96, so that the driving pinion 98 may be engaged and disengaged with the gear wheel 97.

The outer end of the stub shaft 99 is provided with a removable drive crank 101.

A spring pressed pawl 102 is pivotally mounted on the reel bracket 96 for selective engagement with the gear wheel 97 for permitting either racheting of the reel shaft when the crank 101 is rotated to reel-in the cable 52, or free rotation of the reel.

For applying the necessary unwinding reaction to provide for the paying out of the cable 52 after hooking a cargo, a spring pressed brake shoe 103 is suitably mounted in the frame 96, and a lever pawl 104 is provided for selectively maintaining the brake shoe in or out of operative position.

An alarm bell 105 is mounted at the other side of the frame 96 and adapted to be rung by rotation of the shaft 58.

For this purpose, the bell 105 may be mounted on the side wall 96a of the frame 96, and a bell ringing lever 120 is pivotally mounted on the side wall 96a between the bell 105 and the shaft 58. One arm of the ringing lever 120 extends preferably within the bell 105 through a suitable slot formed therein, and the other arm of the lever 120 extends towards the shaft 58. The shaft 58 extends beyond the wall 96a, and a trip arm 121 is secured to and extends from the shaft 58 towards the lever 120, whereby when the shaft 58 rotates, the trip arm 121 trips the lever 120 and rings the bell 105.

In Fig. 4, the ground elements are set up for discharging only a cargo into the tipping receptacle 19, and for this purpose an actuating cable 28' is secured at one end to the guide hook 26 and then preferably extends through a longitudinal opening in the extensible member 18'b into the tubular member 18'a where it is connected with a weight 28".

The improved cargo handling apparatus for aircraft thus described, is used for picking up and discharging cargo by arranging the ground elements as illustrated in Figs. 1, 2, and 3, and by paying out the cable 52 from the aircraft in which the reel 50 is carried, a suitable distance depending on the weight of the cargo C to be discharged, and which cargo is carried by the combined pick up and discharge means 51, the discharge terminal hooks 93 and 93', as aforesaid, passing through the eye 94 connected with the cargo C to be discharged.

In the day-time the pilot on the oncoming aircraft guides the aircraft by flying between the flag signals 32 and 32' at the proper height, the frame 14 having been rotated so that the aircraft will fly preferably into the wind between the flag signals 32 and 32'.

In night-time operation, the pilot steers his course by the intersection of the beams of the search lights 29 and 29'.

The cable 52 will first strike the cable 28 connecting the cargos 27 and 27' to be picked up, and the reel cable 52 will be dragged over the transversely extending cargo connecting cable 28, until one of the spoon ended hook arms 87 hooks against the transversely extending cargo connecting cable 28; when the first action of the moving combined pick up and discharging means striking the stationary cargo connecting cable 28, will be to operate the tong arms 91 and 91' to discharge the cargo C into the tipping receptacle 19, from which it is delivered into the hopper 17 either through the chute 36, or by rotation of the upper end of the tipping receptacle, depending upon the velocity with which the discharged cargo C strikes the upper end of the tipping receptacle 19.

Simultaneously, the hook arm 87 will have caught the transversely extending cable 28 and due to the yielding resistance of the unwinding reaction provided by the spring pressed brake shoe 103, the cable 52 will first be payed out until a velocity has been imparted to the picked up cargo equal to the velocity of the aircraft, the distance that the cable is required to be payed out, depending as aforesaid on the weight of the cargo to be picked up.

When the picked-up cargo has attained the velocity of the moving aircraft, the pilot or other operator in the aircraft may turn the crank 101 to reel in the cable and bring the picked-up cargo within the aircraft, after which the cable may be reeled out for discharging and picking up other cargoes.

When it is desired only to discharge a cargo, a mushroom sleeve 106 is inserted over the connecting head 68, for striking against a cable 28', as aforesaid.

I claim:

1. Ground elements for cargo handling apparatus for aircraft and the like, including a base, laterally spaced mast members extending upwardly from the base, and a receptacle pivotally mounted above the base on the mast members for freely rotating therebetween about a horizontal axis.

2. Ground elements for cargo handling apparatus for aircraft and the like, including a base, laterally spaced mast members extending upwardly from the base, a receptacle pivotally mounted above the base on the mast members for freely rotating therebetween about a horizontal axis, and means for yieldingly resisting movement of the receptacle.

3. Ground elements for cargo handling apparatus for aircraft and the like, including a base, laterally spaced mast members extending upwardly from the base, a receptacle pivotally mounted above the base on the mast members for freely rotating therebetween about a horizontal axis, and resilient means on the receptacle for receiving discharged cargo.

4. Ground elements for cargo handling apparatus for aircraft and the like, including a base, laterally spaced mast members extending upwardly from the base, a receptacle pivotally mounted above the base on the mast members for freely rotating therebetween about a horizontal axis, resilient means on the receptacle for receiving discharged cargo, and means for yieldingly resisting movement of the receptacle.

5. Ground elements for cargo handling apparatus for aircraft and the like, including a base, laterally spaced mast members extending upwardly from the base, and a counterbalanced receptacle pivotally mounted adjacent its lower end on the mast members for freely rotating therebetween about a horizontal axis located above the base.

6. Ground elements for cargo handling apparatus for aircraft and the like, including a base, laterally spaced mast members extending upwardly from the base, a counterbalanced receptacle pivotally mounted adjacent its lower end on the mast members for freely rotating therebetween about a horizontal axis located above the base, and means for yieldingly resisting movement of the receptacle.

7. Ground elements for cargo handling apparatus for aircraft and the like, including a base, laterally spaced mast members extending upwardly from the base, a counterbalanced receptacle pivotally mounted adjacent its lower end on the mast members for freely rotating therebetween about a horizontal axis located above the base, and resilient means on the receptacle for receiving discharged cargo.

8. Ground elements for cargo handling apparatus for aircraft and the like, including a base, laterally spaced mast members extending upwardly from the base, a counterbalanced receptacle pivotally mounted adjacent its lower end on the mast members for freely rotating therebetween about a horizontal axis located above the base, resilient means on the receptacle for receiving discharged cargo, and means for yieldingly resisting movement of the receptacle.

9. Ground elements for cargo handling apparatus for aircraft, including a base, laterally spaced mast members extending upwardly from the base, cable guide means on the upper end of each mast member for supporting a cable extending between the mast members and carrying a cargo at each end, and a tipping receptacle spaced below the cable guide means and pivotally mounted on the masts for freely rotating therebetween about a horizontal axis.

10. Ground elements for cargo handling apparatus for aircraft, including a base, laterally spaced mast members extending upwardly from the base, cable guide means on the upper end of each mast member for supporting a cable extending between the mast members and carrying a cargo at each end, a tipping receptacle spaced below the cable guide means and pivotally mounted on the masts for freely rotating therebetween about a horizontal axis, and means for yieldingly resisting rotation of the receptacle.

11. Ground elements for cargo handling apparatus for aircraft, including a base, laterally spaced mast members extending upwardly from the base, cable guide means on the upper end of each mast member for supporting a cable extending between the mast members and carrying a cargo at each end, a tipping receptacle spaced below the cable guide means and pivotally mounted on the masts for freely rotating therebetween about a horizontal axis, and resilient means on the receptacle for receiving discharged cargo.

12. Ground elements for cargo handling apparatus for aircraft, including a base, laterally spaced mast members extending upwardly from the base, cable guide means on the upper end of each mast member for supporting a cable extending between the mast members and carrying a cargo at each end, a tipping receptacle spaced below the cable guide means and pivotally mounted on the masts for freely rotating therebetween about a horizontal axis, means for yieldingly resisting rotation of the receptacle, and resilient means on the receptacle for receiving discharged cargo.

13. Ground elements for cargo handling apparatus for aircraft, including a base, laterally spaced mast members extending upwardly from the base, a tipping receptacle pivotally mounted above the base on the mast members for freely rotating about a horizontal axis, and a hopper located in cargo receiving position below the receptacle.

14. Ground elements for cargo handling apparatus for aircraft, including a base, laterally spaced mast members extending upwardly from the base, a tipping receptacle pivotally mounted above the base on the mast members for freely rotating about a horizontal axis, the receptacle having a pocket at its lower end, and a hopper located in cargo receiving position below the receptacle.

MANUEL CASTRO.